United States Patent [19]

Vithayathil

[11] Patent Number: 5,032,738
[45] Date of Patent: Jul. 16, 1991

[54] SCHEME FOR RAPID ADJUSTMENT OF NETWORK IMPEDANCE

[76] Inventor: John J. Vithayathil, 3814 NE. 136th Pl., Portland, Oreg. 97230

[21] Appl. No.: 821,196

[22] Filed: Jan. 22, 1986

[51] Int. Cl.$^5$ .................................................. H02J 3/34
[52] U.S. Cl. ....................................... 307/112; 307/82; 307/87; 323/211
[58] Field of Search ............... 307/112, 102, 103, 104, 307/105, 106, 107, 108, 109, 98, 99, 427, 82; 323/208, 209, 210, 211, 218, 219

[56] References Cited

U.S. PATENT DOCUMENTS

| | | | |
|---|---|---|---|
| 3,731,183 | 5/1973 | Johnson et al. | 307/107 X |
| 3,745,437 | 7/1973 | Brown | 307/105 X |
| 3,855,134 | 5/1976 | Woodford | 323/210 |
| 3,932,808 | 1/1976 | Frank | 323/210 |
| 3,936,727 | 2/1976 | Kelley, Jr. et al. | 323/210 |
| 3,992,661 | 11/1976 | Kelley, Jr. | 323/210 |
| 3,999,115 | 12/1976 | South et al. | 322/25 |
| 3,999,117 | 12/1976 | Gyugyi et al. | 323/210 |
| 4,096,431 | 6/1978 | Hammarlund | 323/210 |
| 4,104,576 | 8/1978 | Frank | 323/210 |
| 4,156,176 | 5/1979 | Gyugyi et al. | 323/210 |
| 4,204,151 | 5/1980 | Gyugyi et al. | 323/210 |
| 4,210,860 | 7/1980 | Rosa et al. | 323/210 |
| 4,234,843 | 11/1980 | Gyugyi et al. | 323/210 |
| 4,255,700 | 3/1981 | Takeda | 323/210 |
| 4,302,715 | 11/1981 | Putman et al. | 323/210 |
| 4,353,024 | 10/1982 | Gyugyi | 323/210 |
| 4,356,441 | 10/1982 | Putman et al. | 323/210 |
| 4,357,570 | 11/1982 | Schmid et al. | 323/210 |
| 4,434,376 | 2/1984 | Hingorani | 307/102 |
| 4,437,052 | 3/1984 | Gyugyi | 323/210 |
| 4,438,386 | 3/1984 | Gyugyi | 323/210 |
| 4,451,777 | 5/1984 | Gyugyi | 323/210 |
| 4,470,005 | 9/1984 | Gyugyi | 323/210 |
| 4,472,674 | 9/1984 | Yano et al. | 323/210 |
| 4,513,240 | 4/1985 | Putman | 323/210 |
| 4,555,659 | 11/1985 | Gyugyi | 323/210 |
| 4,560,917 | 12/1985 | Gyugyi | 323/210 |
| 4,567,424 | 1/1986 | Dobsa et al. | 323/210 |
| 4,621,198 | 11/1986 | Roberge et al. | 307/82 |

FOREIGN PATENT DOCUMENTS 2137013  5/1971  France .
 485346  7/1968  Switzerland .
2120875 12/1983  United Kingdom .

Primary Examiner—Paul Ip
Attorney, Agent, or Firm—Robert Southworth, III; William R. Moser; Richard E. Constant

[57] ABSTRACT

A static controlled reactance device is inserted in series with an AC electric power transmission line to adjust its transfer impedance. An inductor (reactor) is serially connected with two back-to-back connected thyristors which control the conduction period and hence the effective reactance of the inductor. Additional reactive elements are provided in parallel with the thyristor controlled reactor to filter harmonics and to obtain required range of variable reactance. Alternatively, the static controlled reactance device discussed above may be connected to the secondary winding of a series transformer having its primary winding connected in series to the transmission line. In a three phase transmission system, the controlled reactance device may be connected in delta configuration on the secondary side of the series transformer to eliminate triplen harmonics.

29 Claims, 3 Drawing Sheets

SCHEME FOR RAPID ADJUSTMENT OF NETWORK IMPEDANCE

FIELD OF THE INVENTION

The present invention relates to the control of transfer impedance in an alternating current system including particularly power transmission systems. More specifically, the present invention is directed to the use of a static controlled reactance connected in series within a transmission system to facilitate effective control of the power or current on the transmission line.

BACKGROUND OF THE INVENTION:

The power transmitted between two points in an AC electric power transmission system is primarily determined by the magnitude of the voltages at the two points, the angle between the vectors related to these two voltages, and the transfer impedance between the two points. Power is proportional to the voltage magnitudes. However, voltage magnitudes are generally controlled to within relatively small range of specified limits to stay within maximum design limits and to prevent unacceptable voltage variations in the supply voltages provided the utility customer. With large fixed transfer impedances, the degree of control of power by adjustment of voltage is limited. The power transmitted is approximately proportional to the sine of the angle between the two voltage vectors. It is therefore common to control the powerflow by adjusting the angle between the respective voltage vectors. The control of powerflow by controlling this angle between the voltage vectors is generally achieved by the relatively slow adjustment of rotor angles of synchronous machines. In such a case, the maximum permissible angle, and thus the power transmitted, may be limited by considerations of system transient and dynamic stability.

A variety of methods involving shunt reactive devices have been used to increase the power transfer capability and transient and dynamic stability limits. Synchronous condensers, shunt capacitors, shunt reactors, thyristor switched and/or controlled static VAR compensators and saturable reactor compensators are shunt devices used for the purpose. These methods are sometimes referred to as Surge Impedance Compensation or Compensation by Sectioning.

Series capacitor compensation is also sometimes utilized to improve stability limits and increase transfer capability by reducing transfer impedance. This method is sometimes referred to as line length compensation and is essentially a passive compensation technique. Series capacitors have, in a limited way, been switched in and out of the line to enhance stability performance. Otherwise, as a passive device, series capacitors cannot be used for smooth control of transmitted power. Since the transmitted power is inversely proportional to the transfer impedance, the effectiveness of series capacitor compensation to reduce transfer impedance and raise power transfer limits increases with increasing levels of series capacitor compensation. For example, with other factors constant, 50 percent series capacitor compensation reduces transfer impedance to approximately half the original transfer impedance and doubles the maximum power in terms of steady state stability limits. An additional 25 percent compensation that would reduce the transfer impedance to one-fourth the original value would increase the maximum power in terms of its steady state stability limit to four times the original value.

Despite this more than proportional increase in power transfer created by increasing levels of series capacitor compensation, high levels of series capacitor compensation have not heretofore been utilized. It is generally accepted that the practical upper limit of the degree of series compensation is on the order of 80 percent.

High levels of compensation close to 100 percent could produce (1) uncontrollable variations in power or current for small changes in terminal voltages or angles; (2) potentially damaging, undamped, subsynchronous oscillations; and (3) large transient currents and voltages during disturbances due to series resonant conditions.

These large transient currents or voltages may be overcome by the use of gapless metal-oxide varistor (MOV) arresters for overvoltage protection of the series capacitors. Limiting the overvoltage across the series capacitors in such high transient current conditions to the clipping level of the MOV arrester has the effect of changing the effective capacitance value of the series capacitor during such a transient period. This temporarily detunes the series resonance circuit and prevents the transient current from reaching very high values.

The first and second problems mentioned above stem from the problem of lack of adequate controllability of power on the AC transmission system. However, this problem is solved by the present invention.

In interconnected power systems, sometimes there is the problem of unscheduled powerflow through parts of the network due to mismatch between scheduled and actual powerflows. The present invention facilitates adjustment of the relative impedances of different parts of the transmission network to make the actual powerflow closer to the scheduled powerflow.

The present invention further facilitates adjustment of the transfer impedances of various parts of the transmission system to provide powerflow conditions while minimizing losses.

OBJECTS OF THE INVENTION

The device of the present invention is a series static controlled reactance to be inserted in an AC electric power transmission system for rapid continuous adjustment of the transfer impedance of the transmission system. The device may include fixed or switchable series capacitive or inductive reactance for operation with the continuously adjusted reactance to increase control sensitivity and/or control range. The device of the present invention could therefore be used to effectively control the power or current in the transmission system to overcome potential problems of higher levels of series capacitor compensation as well as minimize unscheduled powerflow and losses in the transmission system.

It is therefore an object of the present invention to provide a new static means of power control where rapid fine control of the transfer impedance is facilitated through the use of series static controlled reactance;

it is another object of the present invention to provide a high degree of controllability of the power on an AC transmission line;

it is still another object of the present invention to provide such a high degree of controllability of power on an AC transmission line by the use of a series controlled reactance device of relatively small size which becomes a significant or dominant part of the transfer impedance;

it is a further object of the present invention to utilize the series static controlled reactance of the present invention to facilitate series capacitor compensation levels significantly higher than those presently utilized;

it is still a further object of the present invention to enhance transient and dynamic stability performance of such a transmission system utilizing the series static controlled reactance of the present invention along with high levels of series compensation;

it is still a further object of the present invention to facilitate adjustment of the values of impedances of different parts of a transmission system to minimize unscheduled powerflow;

it is still a further object of the present invention to facilitate adjustment of the values of impedances of different parts of a transmission system to minimize losses.

These objects are accomplished by the static controlled reactance device inserted serially with the AC power transmission line as described in the present application.

SUMMARY OF THE INVENTION

The present invention is directed to an apparatus for network impedance adjustment in a transmission line wherein a controlled reactance is connected in series with the transmission line. The controlled reactance is constructed of a controlled inductor (reactor) connected in parallel to a fixed reactance. The controlled inductor is formed of an inductor connected in series with a static switch which controls the conduction period of the inductor to vary the effective reactance of the inductor. Back-to-back connected thyristors could function as the serially connected static switch. Varying the conduction period of the inductor results in discontinuous current through the inductor. The parallel electrical circuit made up of fixed reactances is connected to the controlled inductor to filter harmonics due to the discontinuous current and to obtain the desired range of variable reactance. The controlled reactance device comprising the controlled inductor and parallel reactances may be connected in series with the transmission line directly or by connecting across the secondary winding of a transformer having its primary winding serially connected in the transmission line. Connection of the device on the secondary side of the transformer facilitates arrangement of the device in delta configuration in a three-phase system to eliminate triplen harmonics. Further reduction in harmonics generated by the device is possible by splitting the device into two for connection to wye- and delta-connected secondary windings of the transformer with the primary winding serially connected to the transmission line.

The present invention overcomes the above mentioned first and second problems discussed in the Background of the Invention section of this application by introducing a static controlled series reactance to make the variable reactance a significant, if not dominant, part of the transfer impedance. By varying this controlled reactance, the transfer impedance can be modified sufficiently to effectively control the power or current on the transmission line. Use of this variable reactance along with high levels of series capacitor compensation, allows the device to be constructed of relatively small and economical size. For example, with 100 percent of the series inductive reactance part of the transfer impedance compensated by series capacitors, the transfer impedance will be essentially very small corresponding to the series resistance. In this case, a static controlled series reactance device of small size, for example, 10 percent of the uncompensated transfer impedance, can provide control over a very wide range of power or current. By making the dominant transfer impedance controllable, the problem of uncontrollable power variations during small disturbances of high levels of fixed series capacitor compensation may be easily overcome. The power or current of the system may easily be controlled within specified limits by fast continuous control of the transfer impedance. As power variation is sensitive to variations in the static controlled reactance, dynamic control of the device of the present invention facilitates the damping of any potential subsynchronous oscillations.

The size of the device necessary for rapid adjustment of impedance depends on the range and sensitivity of the power control desired. The device of the present invention may be utilized with any level of series capacitor compensation and even without series capacitor compensation, for example, in the case of a short line. When operating at close to 100 percent series compensation with this device, the power on the line would be more sensitive to terminal voltage magnitudes making it possible to control the power by controlling the terminal voltages, for example, by a mechanical or solid state transformer tap changer, by synchronous machine excitation control, or by a static VAR system. The device of the present invention may be operated to produce fast change of transfer impedance to improve transient stability or to modulate power or current through the transmission line to improve dynamic stability.

The problem of unscheduled powerflow due to mismatch between actual and scheduled powerflows in a transmission system is essentially a problem of controlling the relative impedances of different parts of the network to match the required powerflow. The device of the present invention adjusts the impedance of different parts of the network to match the powerflow schedules and thereby minimize unscheduled powerflow.

As the device of the present invention adjusts impedances of different parts of the network, it could be used to adjust impedances in such a way as to minimize losses in the total system or parts of the system.

BRIEF DESCRIPTION OF THE DRAWINGS

The present invention will become more fully understood from the detailed description given hereinbelow and the accompanying drawings which describe preferred embodiments of the present invention only. In the drawings.

DESCRIPTION OF THE PREFERRED EMBODIMENTS

Figure 1A:
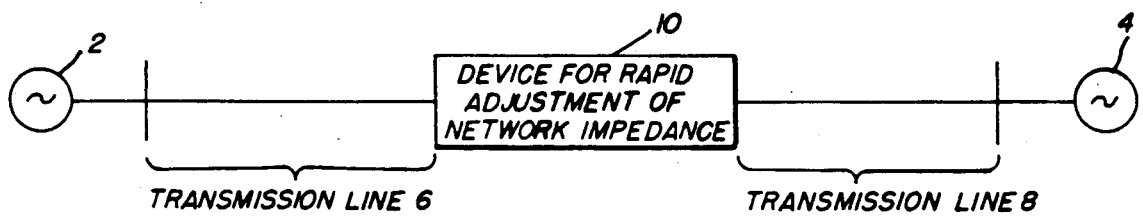
FIG. 1(a) illustrates schematically the insertion of a device for rapid adjustment of network impedance directly in a transmission line.
Figure 1B:
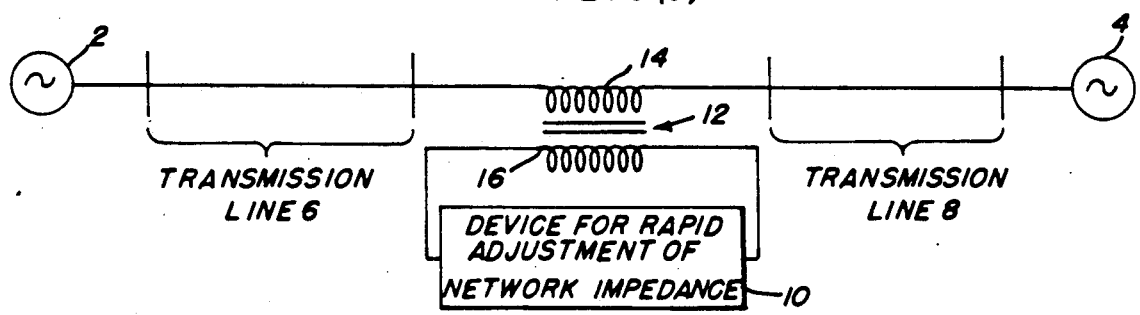
FIG. 1(b) schematically illustrates the insertion of a device for rapid adjustment of network impedance according to the teachings of the present invention into a transmission line through a transformer.
Figure 2:
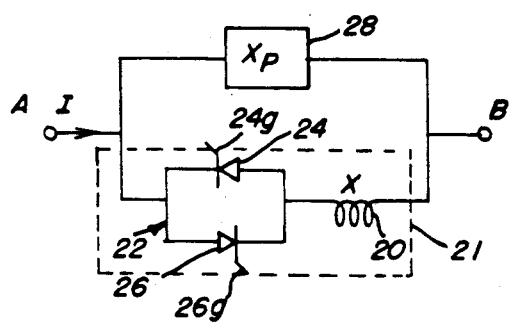
FIG. 2 illustrates one general form of the device for rapid adjustment of network impedance according to the teachings of the present invention.
Figure 3A:
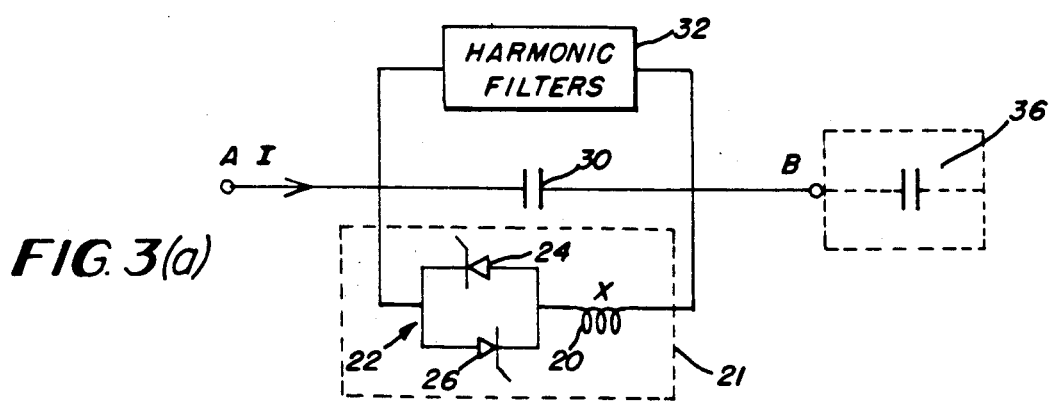
FIGS. 3(a) and 3(b) show additional forms of the device for rapid adjustment of network impedance according to the teachings of the present invention.
Figure 3B:
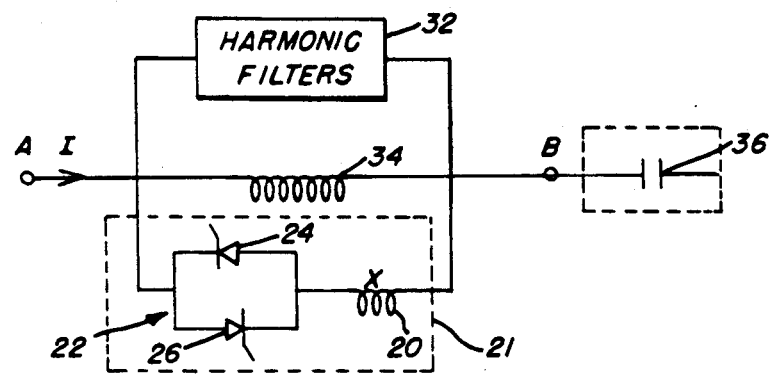

FIGS. 1(a) and 1(b) illustrate two manners of interconnecting a device for rapid adjustment of network impedance formed according to the present invention and illustrated in FIGS. 2, 3(a) and 3(b), respectively, in one line of an AC power transmission system. Each of these figures could alternatively illustrate one line of a three-phase AC power transmission system, or a single phase AC electrical power circuit.

Referring to FIG. 1(a), a transmitting end AC device 2 transmits power to a receiving end AC device 4 via transmission lines 6,8. In order to provide network impedance compensation and power control, a device for rapid adjustment of network impedance 10 formed according to the teachings of the present invention is serially provided in the transmission line.

Alternatively, as shown in FIG. 1(b), wherein like elements are designated by like numbers, the transmitting end AC device 2 transmits power over transmission lines 6,8 to the receiving end AC device 4 in a manner identical to that of FIG. 1(a). Similarly, a device for rapid adjustment of network impedance 10, formed according to the teachings of the present invention, is provided for interaction with the transmission line. However, in the FIG. 1(b) embodiment, a series transformer 12 is provided having a primary coil 14 serially connected in the transmission lines 6,8 and a secondary coil 16 to which the device for rapid adjustment of network impedance 10 formed according to the teachings of the present invention is connected. This arrangement using series transformers requires the extra cost of the transformer but provides several benefits. Use of the transformer provides flexibility in the choice of voltage and current levels in the device for rapid adjustment of network impedance formed according to the teachings of the present invention, which, in the preferred embodiment utilizes back-to-back connected thyristors. Further advantages of the use of such transformers will be discussed later.

A preferred embodiment of the device for rapid adjustment of network impedance 10 of FIG. 1(a), 1(b), is illustrated in FIG. 2. An inductor X,20 is serially connected to a static switching device (generally indicated as 22) to form a controlled inductor 21. The static switching device is, in the preferred embodiment, a pair of back-to-back connected thyristors 24,26 having gates 24G, 26G, respectively. While in the preferred embodiment, a pair of thyristors 24,26 is utilized as a switching device, other suitable power switching devices such as Gate-turn-off thyristors or saturable reactors could also be utilized in place of the thyristors utilized in the preferred embodiment of the present invention or a single triac could be utilized.

A supplemental reactance $X_p$,28 is provided in parallel with the controlled inductor 21. This supplemental reactance $X_p$,28 may have two functions. The discontinuous current through the controlled inductor 21 produces harmonics, the characteristic ones being the odd harmonics 3, 5, 7, 9, 11, 13, etc. These harmonics are filtered by harmonic filters within the supplemental reactance $X_p$,28 connected in parallel thereto. Depending on the harmonic performance required for the particular application, the harmonic filters could consist of tuned or broad-band filters. Additionally, a fixed or switchable capacitor or inductor may be used as all or part of the supplemental reactance $X_p$,28 to obtain the required range of variation of the impedance of the device 10. The supplemental reactance $X_p$,28 may be all or partly made up of an existing reactance or reactance device present in the transmission line.

As an example, assume the reactance of the inductor X,20 has a value of 10 ohms at fundamental frequency and thus the controlled inductor 21 has a reactance which may be varied to any value 10 ohms and above. When the supplemental reactance $X_p$,28 has an inductive reactance of 40 ohms at fundamental frequency, it is possible to obtain a range of variation of impedance across the device 10 of from 8 ohms to 40 ohms inductive due to the parallel combination of 40 ohms with the 10 ohms and up developed by the controlled inductor 21.

The nature of this parallel supplemental reactance $X_p$,28 can be further understood by reference to FIGS. 3(a) and 3(b). In the embodiments of FIGS. 3(a) or 3(b), a fixed capacitor, 30 or a fixed inductor, 34 in parallel with harmonic filters 32 are shown a connected in parallel with the controlled inductor 21. At fundamental frequency, the harmonic filters, 32 would have capacitive reactance. The impedance of the parallel combination of harmonic filters, 32 and the fixed capacitor, 30 or fixed reactor, 34 may be capacitive or inductive. The total impedance across the device between points A and B in FIGS. 2 and 3 could be a capacitive reactance or inductive reactance depending on the relative values of the supplemental reactance $X_p$,28 and the controlled inductor 21. If necessary, a fixed or switchable series capacitor, 36 as shown by dotted lines in embodiments of FIGS. 3(a) and 3(b) may be used with the basic device to raise series compensation levels as desired for transmission needs or in order to enhance the effective control of the variable reactance on transmitted power or current.

In order to limit the fault duty on the switching device, 22 and in particular the thyristors 24,26 of the preferred embodiment, the inductor X,20 may be divided into two, and placed on both sides of the switching device, 22. When the resistance and valve voltage drops in the device are neglected and if it is assumed that the line current contains negligible harmonics, the voltage between the points A and B in FIGS. 2 and 3 would be equal to the product of the line current and the effective fundamental frequency reactance $X_{eff}$ of the device between points A and B. By controlling the firing angle of the thyristors 24,26, between 90° and 180° of this voltage, the conduction angle of the controlled reactance can be varied. This control of the firing angle of the thyristors 24,26 by supplying control signals to their respective gates 24g,26g may be performed in any conventional manner as is well known in the art of power electronics. Due to the unique configuration of the device 10, it is feasible to vary the firing angle of thyristors by use of the current signal from the line or from the parallel fixed reactance circuit as a reference control signal. The variation in the conduction angle of the controlled inductor in this manner has the effect of varying its inductive reactance. Specifically, the firing angle α of the thyristors and the conduction angle α of the thyristor-controlled reactor is related by the equation $$\delta = 2\pi - 2\alpha \tag{1}$$

If at full conduction, the fundamental frequency reactance of controlled inductor 21 is X, the effective fundamental frequency reactance, $X_v$ at any conduction angle is given by the equation $$X_v = \frac{\pi X}{\sigma - \sin \sigma} \tag{2}$$

If $X_p$ is the fundamental frequency reactance of the supplemental reactance 28 parallel to the thyristor controlled reactor, the effective fundamental frequency reactance $X_{eff}$ of the device for rapid adjustment of network impedance is determined by the parallel combination of $X_p$ and $V_v$, and is $$X_{eff} = \frac{X_p \cdot X_v}{X_p + X_v} \tag{3}$$

Thus by varying the firing angle of the thyristors, the impedance of the device may be varied and controlled.

Unlike the thyristor-controlled reactors in conventional shunt static VAR systems, the voltage across the device is variable over a wide range with the thyristor firing angle and the line current. However, this voltage can be calculated from the formula $X_{eff}$ given above and the line current. If the rms value of line current is I, the rms value of voltage across the device, V between points A and B, is $$V = I \cdot X_{eff} \tag{4}$$

Knowing the voltage V and the firing angle of the thyristors, the harmonic currents generated by the discontinuous current in the controlled inductor 21 can be determined by known theory of thyristor-controlled reactors. The rms value of the nth characteristic harmonic component $I_n$, is:

$$I_n = \frac{V}{X} \cdot \frac{4}{\pi} \left[ \frac{\sin(n+1)\alpha}{2(n+1)} + \frac{\sin(n-1)\alpha}{2(n-1)} - \cos\alpha \frac{\sin n\alpha}{n} \right] \tag{5}$$

The device for rapid adjustment of network impedance 10, as illustrated in FIGS. 3(a) or 3(b) could also be inserted in the secondary windings of the series transformer 12 of FIG. 1(b), if desired. The use of series transformer allows flexibility in the choice of voltage and current levels in the thyristor-controlled reactor circuit. Additionally, in a three-phase AC transmission system, the transformer would facilitate delta-connection of the impedance adjusting devices constructed according to the teachings of the present invention thereby reducing filter requirements for triplen harmonics (third, ninth, fifteenth, etc.).

Figure 4A:
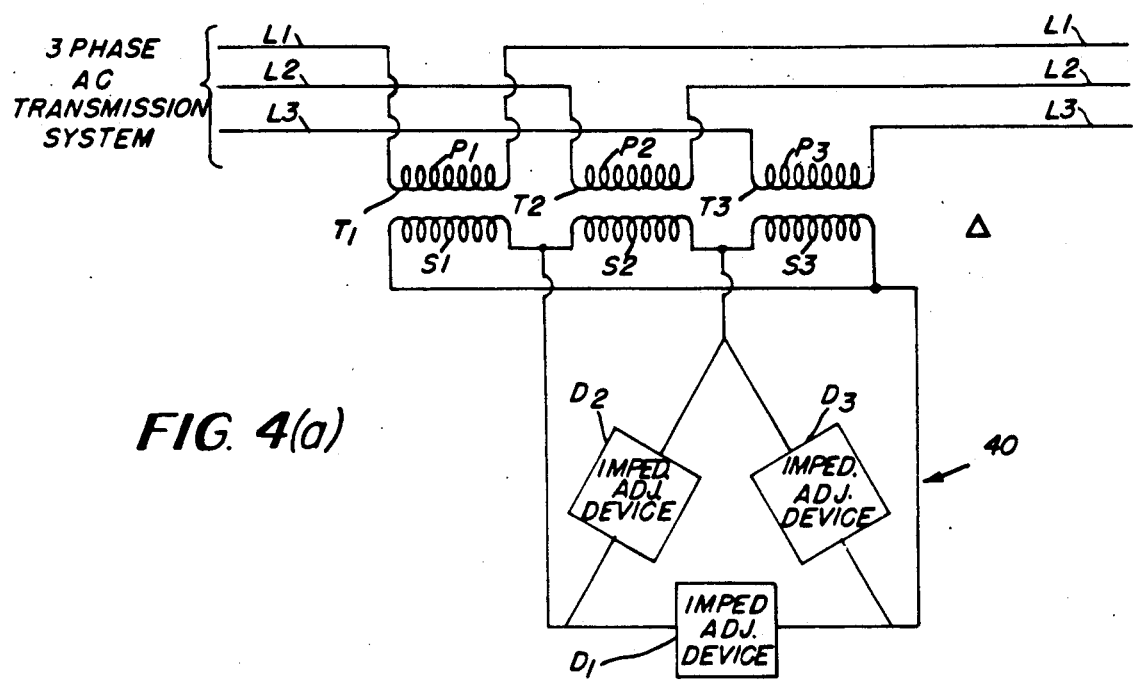
FIG. 4(a) illustrates the connection of devices for rapid adjustment of network impedance according to the teachings of the present invention through a transformer in a three-phase AC transmission system for 6-pulse operation.

FIG. 4(a) illustrates a 6-pulse arrangement utilizing the devices for rapid adjustment of network impedance 10 in a transformer connected system. A delta arrangement (generally indicated as 40) of devices for rapid adjustment of network impedance 10 includes three devices for rapid adjustment of network impedance 10, D1-D3, arranged in a delta configuration. Each of the devices for rapid adjustment of network impedance is connected across a respective secondary coil or winding S1-S3 of a transformer T1-T3. A corresponding primary coil or winding of each transformer T1-T3 is serially connected to a transmission line L1-L3 of a three-phase AC transmission system for transmitting AC power from a transmitting end AC device on one end of the transmission lines L1-L3 to a receiving end AC device on the other end thereof.

The 6-pulse arrangement shown in FIG. 4(a) has secondary coils of the transformer connected in a delta configuration. An alternate 6-pulse arrangement connects the secondary windings of the transformers in Y (Wye) configuration with three devices for rapid adjustment of network impedance arranged in delta configuration and connected to the secondary windings of the transformer.

Figure 4B:
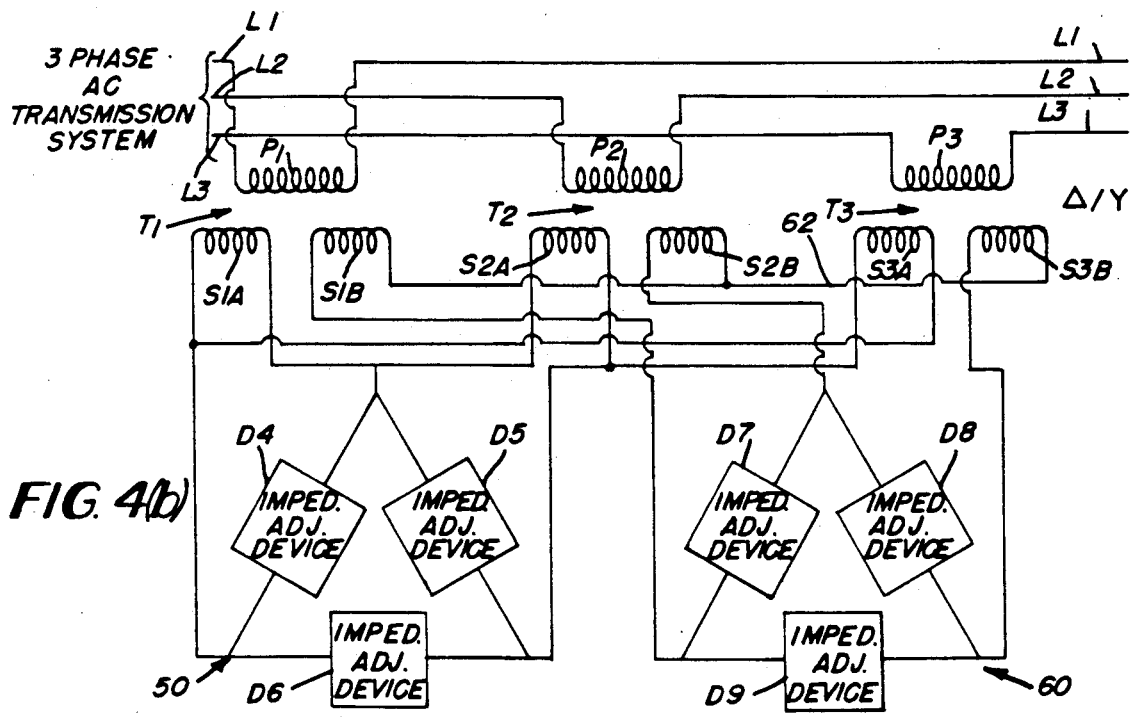
FIG. 4(b) illustrates the insertion of devices for rapid adjustment of network impedance formed according to the teachings of the present invention through a transformer in a three-phase AC transmission system for 12-pulse operation.

In the embodiment of FIG. 4(b), a 12-pulse arrangement utilizing a delta/wye configuration is illustrated. Like elements with FIG. 4(a) are labelled with like numerals. In the embodiment of FIG. 4(b), six impedance adjusting devices constructed according to the teachings of the present invention (D4-D6 and D7-D9) are utilized. The series transformers T1-T3 have two secondary coils (S1a-S3a, and S1b-S3b, respectively). The impedance adjusting devices D4-D6 are arranged in a delta configuration (generally indicated as 50) which is similar to that illustrated in FIG. 4(a). This delta configuration is connected to the first set of secondary coils S1a-S3a connected in delta configuration in the same manner as transformer secondary coils S1-S3 in 4(a).

Additionally, the impedance adjusting devices D7-D9 of the FIG. 4(b) embodiment, are arranged in a delta configuration (generally indicated as 60) and connected to the second set of secondary coils S1b-S3b of the series transformer connected in wye configuration. One terminal of each second secondary coil S1b-S3b is commonly connected to an interconnection line 62.

The 12-pulse arrangement illustrated in FIG. 4(b) allows the minimization of harmonic filtering requirements by providing for cancellation of harmonics (fifth, seventh, seventeenth, nineteenth, etc.) which are not characteristic of 12-pulse operation.

The control of the thyristors 24,26 of the static switching device 22, of each of the devices for rapid adjustment of network impedance 10 may be accomplished as would occur to one of ordinary skill in the art, and as is frequently done in the art in devices such as static VAR systems or HVDC Transmission Systems. Control of these devices would require measurement of appropriate system variables, determination of the firing angles of the thyristors to obtain required steady-state and transient characteristics, and the generation of firing pulses. However, such techniques would be well within the skill of one of ordinary skill in the art.

Each device for rapid adjustment of network impedance 10 or its component parts would be provided, according to the teachings of the present invention, with protection normally required for such devices in power systems such as arresters, forced firing of thyristors to prevent valve failure, and/or bypass switches or gaps, and appropriate grounding arrangements.

The invention has been developed and explained primarily with respect to electric power transmission systems, but is obviously applicable to other high voltage and low voltage electrical power circuits and such uses are intended to be covered by the invention.

The invention being thusly described, it would be obvious that the invention could be varied in many ways without departing from the spirit and scope of the present invention. Any modifications within the spirit and scope of the claims set forth below are intended to be encompassed by these claims, the specification of the present application not being limitative of the invention of the present application.

I claim:

1. An apparatus disposed in an A.C. line between an A.C. source and load for impedance adjustment in the A.C. line comprising:
   a controlled inductor device serially connected in said A.C. line with said source and load, said controlled inductor device including,
   an inductor, and
   switch means, connected in series with said inductor, for adjustably controlling the conduction period of the current passing through said inductor to thereby vary the effective reactance of said inductor; and
   a continuously operable parallel reactance connected in parallel with said controlled inductor device.

2. The apparatus of claim 1 wherein said parallel reactance includes harmonic filters to filter harmonics caused by discontinuous current in said controlled inductor device.

3. The apparatus of claim 1 wherein said parallel reactance is primarily inductive.

4. The apparatus of claim 1 wherein parallel reactance is primarily capacitive.

5. The apparatus of claim 1 further comprising a capacitance connected in series with said controlled inductor device in said A.C. to raise the series capacitor compensation level in said A.C. line.

6. The apparatus of claim 5 wherein said capacitance is a switched capacitor.

7. The apparatus of claim 1 wherein said switch means comprises:
   two thyristors connected back-to-back and each having a control gate; and
   means, connected to said control gates, for controlling the firing of said thyristors to thereby control the impedance of said apparatus.

8. The apparatus of claim 1 wherein said inductor is formed of first and second inductor portions connected in series with said switch means with said switch means being disposed therebetween, said first and second inductor portions limiting fault current through said switch means.

9. An apparatus disposed in an A.C. line between an A.C. source and load for impedance adjustment in the A.C. line comprising:
   a transformer having a primary coil and a secondary coil; said primary coil being serially connectable in said A.C. line with said A.C. source and load;
   a controlled inductor device connected across said secondary coil of said transformer, said controlled inductor device including
   an inductor, and
   switch means, connected in series with said inductor, for adjustably controlling the conduction period of the current passing through said inductor to thereby vary the effective reactance of said inductor; and
   a continuously operable parallel reactance connected in parallel with said controlled inductor device.

10. The apparatus of claim 9 wherein said parallel reactance includes harmonic filters to filter harmonics caused by discontinuous current in said controlled inductor device.

11. The apparatus of claim 9 wherein said parallel reactance is primarily inductive.

12. The apparatus of claim 9 wherein said parallel reactance is primarily capacitive.

13. The apparatus of claim 9 further comprising a capacitance connected in series with said controlled inductor device in said A.C. line to raise the series capacitor compensation level in said A.C. line.

14. The apparatus of claim 13 wherein said capacitance is a switched capacitor.

15. The apparatus of claim 9 wherein said switch means comprises:
   two thyristors connected back-to-back and each having a control gate; and
   means, connected to said control gates, for controlling the firing of said thyristors to thereby control the impedance of said apparatus.

16. The apparatus of claim 9 wherein said inductor is formed of first and second inductor portions connected in series with said switch means with said switch means being disposed therebetween, said first and second inductor portions limiting faul current through said switch means.

17. The apparatus of claim 9 wherein said A.C. line is a three-phase transmission line having three conductors, each said conductor having a said transformer with a said primary coil serially connected therein;
   a said controlled inductor device and the parallel reactance connected thereto being connected across the secondary coil of each said transformer.

18. The apparatus of claim 17 wherein said secondary coils and controlled inductor devices and parallel reactances connected thereto are connected together in a delta configuration.

19. The apparatus of claim 17 wherein said secondary coils of the transformer are arranged in a Y (Wye) configuration;
   said controlled inductor devices and parallel reactances connected thereto being arranged in a three-phase delta configuration and connected to said Y (Wye)-connected secondary coils.

20. The apparatus of claim 17 wherein each said transformer includes first and second secondary coils, the first secondary coils from each said transformer being connected together in three-phase delta configuration, the second said secondary coils from each said transformer being connected together in three-phase Y (Wye) configuration;
   each said controlled inductor devices and their associated said parallel reactances being connected in three-phase delta configuration, one said controlled inductor device and its associated said parallel reactance being connected to the said delta-connected and Y-connected secondary coils of said transformers.

21. An apparatus disposed in an A.C. line between an A.C. source and load for network impedance adjustment in the A.C. line comprising:
   continuously operable reactance means, connected in series with said A.C. line between said A.C. source and load, for providing coarse correction of the impedance of said A.C. line; and controlled inductor means, connected in series with said A.C. line between said A.C. source and load across said reactance means, for adjusting the impedance of said A. C. line, said controlled inductor means including, an inductor, and switch means, connected in series with said inductor, for adjustably controlling the conduction period of the power supplied through said inductor to thereby vary the effective reactance of said apparatus from the reactance of said reactance means alone to that of the parallel combination of said reactance means and said inductor.

22. The apparatus of claim 21 wherein said reactance means includes harmonic filter means for filtering harmonics caused by discontinuous current in said controlled inductor device.

23. The apparatus of claim 21 wherein said reactance means is primarily an inductance.

24. The apparatus of claim 21 wherein said reactance means is primarily capacitive.

25. The apparatus of claim 21 further comprising a capacitance connected in series with said controlled inductor device in said A.C. line to raise the series capacitor compensation level in said A.C. line.

26. The apparatus of claim 25 wherein said capacitance is a switched capacitor.

27. The apparatus of claim 21 wherein said switch means comprises:

two thyristors connected back-to-back and each having a control gate; and means, connected to said control gates, for firing of said thyristors to thereby control the impedance of said apparatus.

28. The apparatus of claim 21 wherein said inductor is formed of first and second inductor portions connected in series with aid switch means with said switch means disposed between to limit fault current through said switch means.

29. A method of impedance adjustment in an A.C. line disposed between an A.C. source and load comprising:

forming an impedance adjustment device including,
an inductor,
switching means, connective in series with said inductor, and
a continuously operable parallel reactance connected in parallel with said series connection of said inductor and said switch means;

inserting said impedance adjustment device serially within said A.C. line between said source and load; and adjustably controlling the conduction period of the current passing through said inductor to thereby adjust the impedance of said line.

* * * * *